United States Patent [19]

Scheffer

[11] 4,425,934

[45] Jan. 17, 1984

[54] HEAD OF AN AIR PUMP FOR INFLATING PNEUMATIC TIRES HAVING A MOTORCYCLE VALVE

[75] Inventor: Walter Scheffer, Sundern, Fed. Rep. of Germany

[73] Assignee: Scheffer-Klute GmbH & Co., Sundern, Fed. Rep. of Germany

[21] Appl. No.: 274,094

[22] Filed: Jun. 16, 1981

[30] Foreign Application Priority Data

Sep. 17, 1980 [DE] Fed. Rep. of Germany ....... 3035036

[51] Int. Cl.³ .............................................. F16K 15/20
[52] U.S. Cl. .................................. 137/223; 137/846; 251/149.7; 417/566
[58] Field of Search ........................ 137/223, 228, 231; 251/149.7; 417/456, 458, 566

[56] References Cited

U.S. PATENT DOCUMENTS

| | | | |
|---|---|---|---|
| 1,442,933 | 1/1923 | Firpo | 137/231 |
| 2,424,595 | 7/1947 | Warren | 417/566 |
| 2,672,101 | 3/1954 | Shields | 417/566 |
| 2,887,961 | 5/1959 | Hawley | 417/550 |
| 2,986,098 | 5/1961 | Trout | 417/566 |
| 3,822,720 | 7/1974 | Souza | 417/566 |
| 3,926,205 | 12/1975 | Gourlet | 137/231 |
| 4,091,999 | 5/1978 | Voos | 137/231 |

FOREIGN PATENT DOCUMENTS 2109037 9/1976 Fed. Rep. of Germany ...... 417/566
1199610 7/1970 United Kingdom ................ 417/566

*Primary Examiner*—William L. Freeh
*Assistant Examiner*—Jane E. Obee

[57] ABSTRACT

A head of an air pump for inflating pneumatic tires having a motorcycle valve comprises a pot-shaped housing defining a pressure space. The housing is arranged to be connected to an air pump defining a piston space so that the pressure space and the piston space are in communication with one another. A projection is formed integral with the pot-shaped housing and defines a cavity appliable upon a motorcycle valve including a valve body and a spring-biased check valve. A partition is provided between the cavity and the pressure space, the cavity of the projection communicating by at least one air duct passing through the partition with the pressure space. A check valve is provided in the cavity of the projection and is defined by a seal arranged around a lifting pin projecting from the partition into the cavity and leaving free between itself and the lifting pin a connecting duct. This seal forms with its free end face a sealing surface facially engaging the motorcycle valve body upon lifting of the spring-biased check valve of the motorcycle valve body accommodated by the projection by the lifting pin and engages with a sealing lip at the connecting duct side the lifting pin in shutting off the air duct to the pressure space.

6 Claims, 3 Drawing Figures

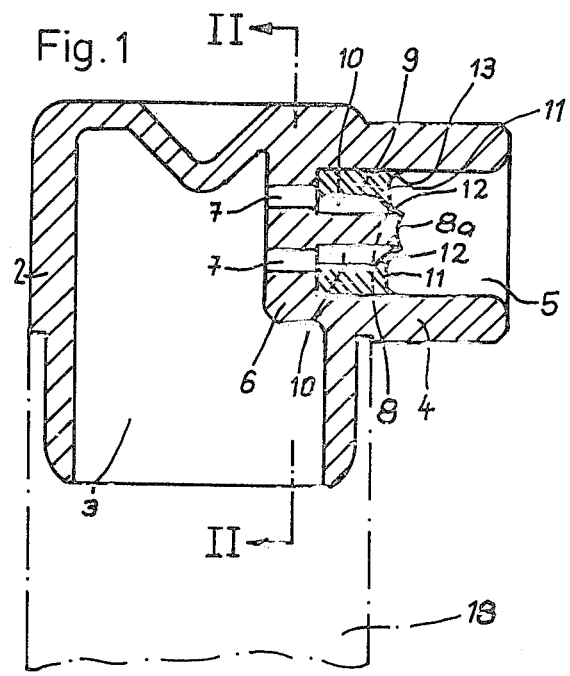
Fig. 1
Fig. 3
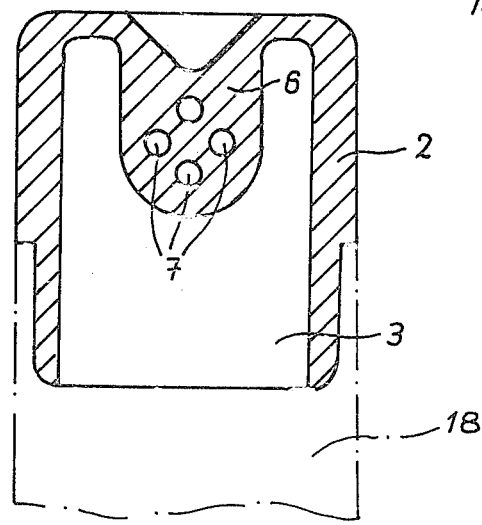
Fig. 2

HEAD OF AN AIR PUMP FOR INFLATING PNEUMATIC TIRES HAVING A MOTORCYCLE VALVE

BACKGROUND OF THE INVENTION

This invention relates to a head of an air pump for inflating pneumatic tires having a motorcycle valve.

Motorcycle valves which are known since some time as so-called Schrader valves and are marketed as such have prevailingly only been used for cars, motorcycles and motorbikes. These motorcycle valves, however, since recently also find much acceptance for pneumatic tires of bicylces. In order to be able to operate these motorcycle valves, air pumps are required, however, in a disadvantageous manner which are equipped with a ball or plug check valve which requires particular productions and unfavorably affects the cost of these air pumps.

SUMMARY OF THE INVENTION

It is, therefore, an object of the present invention to equip an air pump with a head which permits in a simple manner, in a cost aspect more favorable production manner and in an effectively reliable manner an inflation of pneumatic tires which are equipped with a conventional motorcycle valve, i.e. a Schrader valve.

To attain this object the present invention provides a head of an air pump for inflating pneumatic tires having a motorcycle valve which comprises a pot-shaped housing defining a pressure space and arranged to be connected to an air pump defining a piston space so that the pressure space and the piston space are in communication with one another; a projection formed integral with the pot-shaped housing and defining a cavity appliable upon a motorcycle valve including a valve body and a spring-biased check valve; a partition between the cavity and the pressure space, the cavity of the projection communicating by at least one air duct passing through the partition with the pressure space, and a check valve provided in the cavity of the projection and defined by a seal arranged around a lifting pin projecting from the partition into the cavity of the projection and leaving free between itself and the lifting pin an annular connecting duct, said seal forming with its free end face a sealing surface facially engaging the motorcycle valve body upon lifting of the spring-biased check valve of the motorcycle valve body accommodated by the projection by the lifting pin and engaging with a circumferential sealing lip at the connecting duct side the lifting pin in shutting off the air duct to the pressure space.

The air pump head with its seal as proposed by the invention permits in a simple and reliable manner the inflating of motorcycle valves (Schrader valves)—for doing so, the air pump head is equipped with a simply designed, permanently effective seal able to be produced at low cost, said seal acting as check valve and replacing the conventional, technically complex and costly ball and plug check valves.

The annular seal with a sealing surface for the motorcycle valve and a sealing lip for shutting off the air duct or ducts in the pump head is able to be produced in one piece of rubber or plastic at low price and has a high utility rating. A single sealing part in a specific shaping and with a specific function replaces according to the proposal of this invention the presently known, technically complex sealing elements resulting in an improved function.

BRIEF DESCRIPTION OF THE DRAWING

An embodiment of the invention will now be described by way of example and with reference to the accompanying drawing in which:

FIG. 1 is a vertical section of a head of an air pump for inflating pneumatic tires having a motorcycle valve;

FIG. 2 is a vertical section of the same head taken along the line II—II of FIG. 1, and FIG. 3 is a longitudinal section of a partial region of the motorcycle valve.

DESCRIPTION OF THE PREFERRED EMBODIMENT

FIGS. 1 and 2 show an air pump 18 (illustrated in part in phantom) provided with a head according to the invention. The air pump head is constructed and equipped in its structural design such that it is able to be used for inflating pneumatic tires which are equipped with a motorcycle valve 1, namely a so-called Schrader valve shown in FIG. 3. Schrader valves are known and are employed since long ago for pneumatic tires of various types.

The air pump head has a pot-shaped housing 2 open at its end face connectible to the housing of the air pump 18, said pot-shaped housing 2 defining a pressure space 3 in direct communication with the piston space of the air pump 18. At the peripheral surface of the pot-shaped housing 2 of the air pump head, a tubular projection 4 extending at right angles to the axis of the pot-shaped housing 2 is integrally formed which is appliable (pluggable) with a cavity 5 open at its free end to the free end of the motorcycle valve 1. There is of course also the possibility to have said projection 4 extend in the longitudinal axis of the pot-shaped housing 2, i.e. that the projection 4 projects from the base of the pot-shaped housing 2 and not from the peripheral surface thereof. The pressure space 3 and the cavity 5 of the pump head are separated from one another by a partition 6. In the partition 6, there is provided at least one aperture on air duct 7 which connects the pressure space 3 and the cavity 5 with one another. Preferably, the air duct 7 extends in longitudinal direction of the projection 4, i.e. at right angles to the longitudinal axis of the pot-shaped housing 2.

As will be noted in the embodiment shown by way of example in the drawing, there are provided in the partition 6 a plurality of air ducts 7, preferably four arranged about the longitudinal center line of the projection 4 at an identical spacing relative to one another and to said center line.

A cylindrical lifting pin 8 projects from the partition 6 into the cavity 5 of the projection 4 and extends in the longitudinal center line of the projection 4 through approximately half the length of the projection 4.

In the cavity 5 of the projection 4, an annular seal 9 is provided which engages the circumferential surface of the cavity 5 and is supported on the cavity base, namely the partition 6. This annular seal 9 leaves free between itself and the lifting pin 8 an annular connecting duct 10. The annular seal 9 has a cylindrical shape and a rectangular cross section extending with the larger rectangle extent in longitudinal direction of the projection 4. The annular connecting duct 10 circumferentially extending around the lifting pin 8 possesses a corresponding rectangular cross section, all air ducts 7 opening with their entire cross sections or only with a partial cross section into the region of said annular connecting duct 10.

The annular seal 9 is inserted in a preferred manner with a press seat in the cavity 5 of the projection 4 and is located in position there.

The free end face of the annular seal 9 remote from the partition 6 defines a sealing surface 11 coacting with the motorcycle valve 1.

Furthermore, the annular seal 9 at the connecting duct side has a circumferential sealing lip 12 engaging the lifting pin 8, said sealing lip being integrally formed at the annular seal 9 in the region of the sealing surface 11.

Also, the annular seal 9 at the sealing surface side may have further a circumferential sealing lip 13 engaging the peripheral surface of the cavity 5 of the projection 4.

The annular seal 9 is made of a resilient material, preferably of rubber or plastic.

The conventional motorcycle valves 1 have, as shown in FIG. 3, a valve body 14 with an axial air duct 15 in which a check valve 17 is arranged subject to the action of a compression spring 16, said check valve 17 releasing the air duct 15 for permitting air to pass upon lifting the check valve in counteraction to the spring bias.

Such motorcycle valves 1 are known, and therefore a closer description of their overall design and their function can be dispensed with.

The operation of the pump head according to the invention is thus:

The pump head arranged at the air pump 18 is plugged with its tubular projection 4 into the valve body 14 of the motorcycle valve 1 so that the valve body 14 is positioned with a partial region of its length in the cavity 5 of the projection 4. Upon the application of pressure, the lifting pin 8 acts with its end face 8a upon the end face 17a of the check valve 17, and same is lifted, i.e. urged back, in counteraction to the force of the compression spring 16. At the same time, the annular seal 9 engages with its sealing surface 11 the end face 14a of the valve body 14 sealingly, and the circumferential sealing lip 12 of the annular seal 9 sealingly engages the lifting pin 8 so that thereby the air duct 7 or the air ducts 7 are shut off to the pressure space 3 and thus to the piston space of the air pump 18.

The annular seal 9 thus acts as a check valve in that it permits air to flow when there is according air pressure from the air pump 18 through the pressure space 3, the air duct or ducts 7, the annular connecting duct 10 and in urging back the circumferential sealing lip 12 from the lifting pin 8 into the cavity 5 of the tubular projection 4 and thus into the motorcycle valve 1.

When this air pressure decreases, as a result of the back pressure an engagement of the circumferential sealing lip 12 with the lifting pin 8 is immediately effected and thus the air duct or ducts 7 is or are caused to close to the pressure space 3—this defines a check valve safeguard in a simplest and reliable manner.

When removing the air pump 18 from the motorcycle valve 1, there is not effected any air compression in the pressure space 3, and the circumferential sealing lip 12 engages the lifting pin 8 as a result of its resiliency. At the same time, the motorcycle valve 1 closes as a result of the spring loading.

This pump head is suited both for manually operated and power air pumps.

The invention may be embodied in other specific forms without departing from the spirit or essential characteristics thereof. The embodiment is therefore to be considered in all respects as illustrative and not restrictive.

What is claimed is:

1. A head of an air pump for inflating pneumatic tires having a Schrader valve, said head comprising
    (a) a housing (2) defining a pressure space (3) and arranged to be connected to an air pump (18) defining a piston space so that the pressure space (3) and the piston space are in communication with one another;
    (b) a tubular projection (4) formed integral with the housing and defining a cavity (5) appliable upon a Schrader valve (1) including a valve body (14) and a spring-biased check valve (17);
    (c) a partition (6) between the cavity and the pressure space, the cavity of the projection communicating by at least one air duct (7) passing through the partition with the pressure space, and (d) a check valve provided in the cavity of the projection and defined by an annular seal (9) composed of a resilient material selected from the group consisting of rubber and plastic and arranged around a stationary lifting pin (8) projecting from the partition into the cavity of the projection and leaving free between itself and the lifting pin an annular connecting duct (10), said resilient annular seal comprising a flexible annular sealing lip (12) integrally formed to said annular seal and projecting inwardly, across said annular connecting duct and with the free annular edge of said sealing lip in sealing engagement with the exterior surface of said lifting pin and adapted to permit flow of air through said annular connecting duct from said air duct but prevent flow of air through said annular connecting duct towards said air duct, said seal forming with its free annular edge a sealing surface (11) for facially engaging the Schrader valve body (14) and said lifting pin forming with its free end an end face for engaging and depressing said spring-biased check valve of said Schrader valve, whereby, said resilient annular seal with said flexible annular sealing lip serving both as a seal when said tubular projection is applied to said Schrader valve and, in cooperation with said lifting pin, as a one-way valve permitting air flow through said annular connecting duct into said Schrader valve but preventing air flow from said Schrader valve through said annular connecting duct.

2. A head of an air pump as set forth in claim 1, wherein the annular seal is retained pressed into the cavity (5) of the projection (4) and engages with its circumferential surface the periphery of the cavity and is supported with one end face on the partition (6) provided with the air duct and arranged between the cavity of the projection and the pressure space.

3. A head of an air pump as set forth in claim 2, wherein the seal (9) has a cylindrical basic shape and has a rectangular cross section extending with the larger rectangle extent in longitudinal direction of the projection.

4. A head of an air pump as set forth in claim 1, wherein the connecting duct (10) extending circumferentially between the lifting pin and the seal has a rectangular cross section extending with the larger rectangle extent in longitudinal direction of the projection, the air duct opening at least with a partial region of the cross section thereof into the connecting duct.

5. A head of an air pump as set forth in claim 1, wherein the sealing surface provided at the free end face of the annular seal is arranged set back in relation to the end face of the lifting pin for depressing the spring-biased check valve.

6. An air pump head for inflating pneumatic tires and the like having a Schrader valve including a cylindrical body having an annular end surface and a depressible pin having an end surface in said cylindrical body for operating a check valve, said head comprising:

(a) wall means defining a chamber adapted to be connected to a source of compressed air;

(b) means extending from said wall means defining a cylindrical cavity having an opening adapted to receive a portion of said cylindrical body including said annular end surface of said Schrader valve;

(c) a stationary cylindrical lifting pin projecting from said wall means into and along the axis of said cylindrical cavity, said lifting pin having an end face for engaging said end face of said depressible pin and depressing said depressible pin as said portion of said cylindrical body of said Schrader valve is inserted through said opening into said cylindrical cavity;

(d) at least one aperture extending through said wall means adjacent said lifting pin; and (e) an annular sealing member composed of a resilient material positioned in said cylindrical cavity with one annular end thereof in contact with said wall means, the peripheral exterior surface thereof in contact with the interior surface of said cylindrical cavity, the interior surface thereof spaced from the exterior surface of said lifting pin to define an annular duct therebetween for directing compressed air from said at least one aperture along the length of said lifting pin, the annular end thereof opposite said one end forming a sealing surface for contacting said annular end surface of said cylindrical body of said Schrader valve when said portion of said cylindrical body is inserted through said opening into said cylindrical cavity;

(f) said annular sealing member including an integral flexible annular sealing lip projecting inwardly, across said annular duct with the free annular edge of said sealing lip in sealing engagement with said exterior surface of said cylindrical lifting pin forming a one-way valve in said annular duct permitting airflow in only one direction from said chamber, through said at least one aperture and through said annular duct toward said opening in said cylindrical cavity;

(g) whereby, said resilient annular sealing member with said flexible annular sealing lip serves both as a seal when said annular end surface of said cylindrical body is in engagement with said sealing surface of said sealing member and said pin of said Schrader valve is depressed by said lifting pin and, in cooperation with said lifting pin, as a one-way valve permitting flow of compressed air from said chamber, through said at least one aperture and said annular duct and past said flexible annular sealing lip of said annular sealing member into said Schrader valve and preventing flow of air in the reverse direction from said Schrader valve into said annular duct.

* * * * *